(12) United States Patent
Gupta et al.

(10) Patent No.: US 8,767,896 B2
(45) Date of Patent: Jul. 1, 2014

(54) METHODS AND APPARATUS FOR MIMO DETECTION

(71) Applicant: Samsung Electronics Co., Ltd, Suwon-si (KR)

(72) Inventors: Ankit Gupta, Richardson, TX (US); Chaiman Lim, Seoul (KR); Zhouyue Pi, Allen, TX (US)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

(21) Appl. No.: 13/625,676

(22) Filed: Sep. 24, 2012

(65) Prior Publication Data

US 2013/0077721 A1 Mar. 28, 2013

Related U.S. Application Data

(60) Provisional application No. 61/539,411, filed on Sep. 26, 2011.

(51) Int. Cl.
*H04L 1/02* (2006.01)

(52) U.S. Cl.
USPC ............................ 375/347; 375/147; 375/267

(58) Field of Classification Search
CPC .. H04B 1/7113; H04B 1/7115; H04B 1/7117; H04B 7/043; H04B 7/02; H04B 7/0413; H04L 27/2647; H04L 1/0618; H04L 1/0631; H04L 1/0656; H04L 1/0668; H04L 1/0675; H04L 1/06; H04L 25/0204; H04L 25/021; H04L 25/0222; H04L 25/0248
USPC ......... 375/141, 147, 219, 260, 267, 316, 340, 375/349, 347
See application file for complete search history.

(56) References Cited

U.S. PATENT DOCUMENTS

| 7,720,169 B2 * | 5/2010 | Reuven et al. ................. 375/267 |
| 2009/0316803 A1 * | 12/2009 | Paker et al. .................... 375/260 |
| 2010/0054365 A1 * | 3/2010 | Cheng et al. ................. 375/320 |

* cited by examiner

*Primary Examiner* — Dac Ha

(57) ABSTRACT

A transmitted signal estimate based on signals received in a layer i within a multiple input, multiple output transmission system and based upon selected constellation points for other, previously processed layers is quantized to a nearest constellation point. A list of candidates headed by the nearest constellation point and with remaining candidates presorted by proximity to the head is selected, for each such quantized estimate based on constellation point selections for previously processed layers. To select K best candidates for the transmitted signal estimates of the current layer i, the proximity of the candidates at the head of each list to the signal estimate for the current layer are compared, and the closest candidate is selected. The list containing the selected candidate is advanced, and proximity of the transmitted signal estimate to all list heads is again evaluated and the closest candidate selected.

20 Claims, 8 Drawing Sheets

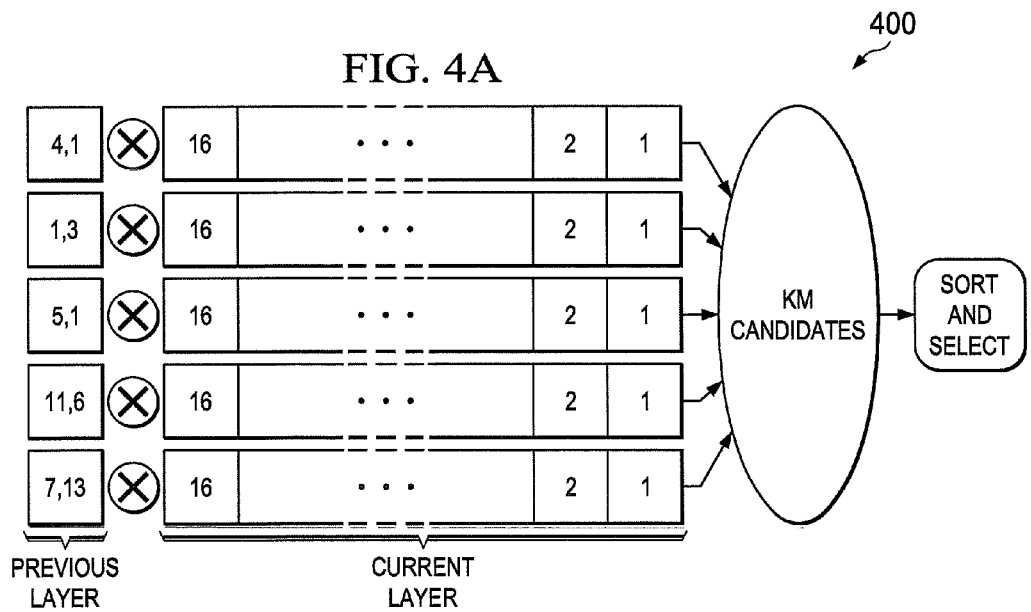
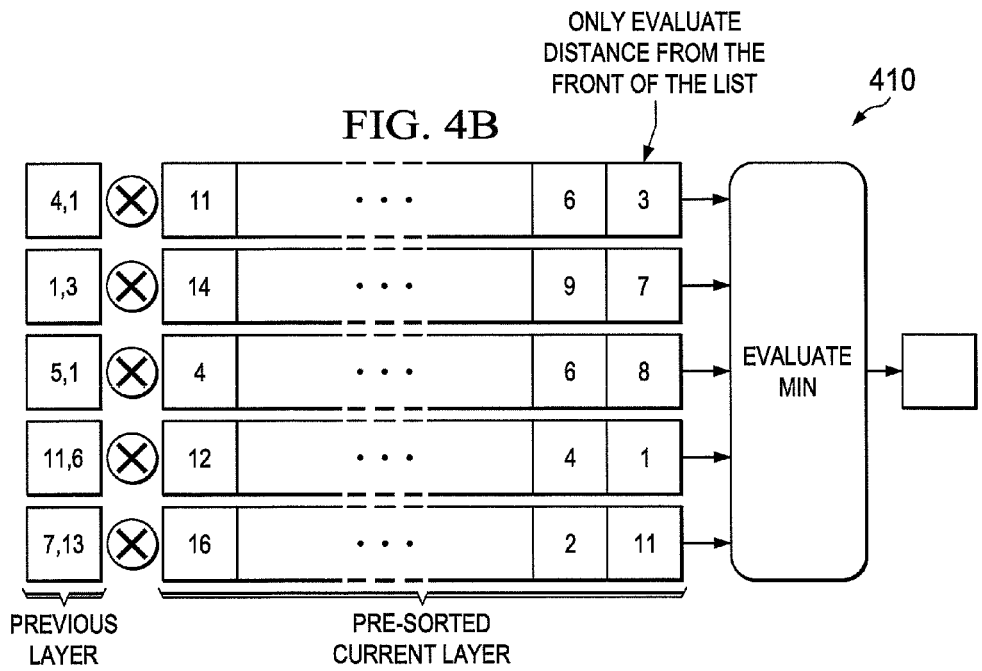

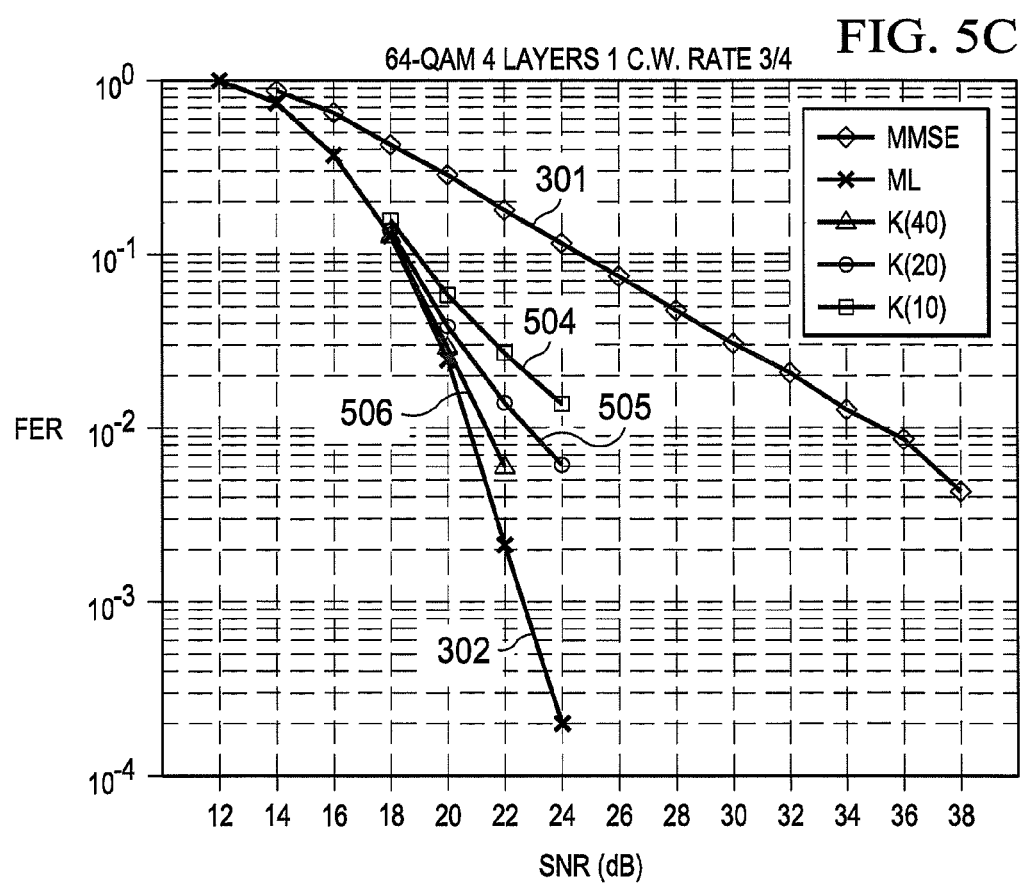

METHODS AND APPARATUS FOR MIMO DETECTION

This application incorporates by reference the content of U.S. Provisional Patent Application Ser. No. 61/539,411, filed Sep. 26, 2011, entitled "METHODS AND APPARATUS FOR MIMO DETECTION." The content of the above-identified patent documents is incorporated herein by reference.

TECHNICAL FIELD

The present disclosure relates generally to detection of signals in wireless mobile communication systems and, more specifically, to an improved detection algorithm using a selected number of the best detected signals.

BACKGROUND

Detection of signals in multiple input, multiple output (MIMO) wireless transmission systems presents a challenging problem involving complex and extensive computations. For mobile handsets, the number of computations that must be performed to detect each transmitted symbol can require substantial power consumptions, decreasing battery life.

There is, therefore, a need in the art for improved signal detection in MIMO transmission systems.

SUMMARY

A transmitted signal estimate based on signals received in a layer i within a multiple input, multiple output transmission system and based upon proximity to selected constellation points for other, previously processed layers is quantized to a nearest constellation point. A list of candidates headed by the nearest constellation point and with remaining candidates presorted by proximity to the head is selected, for each such quantized estimate based on constellation point selections for previously processed layers. To select K best candidates for the transmitted signal estimates of the current layer i, the proximity of the candidates at the head of each list to the signal estimate for the current layer are is compared, and the closest candidate is selected. The list containing the selected candidate is advanced, and proximity of the transmitted signal estimate to all list heads is again evaluated and the closest candidate selected. The proximity comparison, selection and advancing proceed iteratively until K candidates are selected for the next layer. Upon completing a layer, subsequent layers are processed in like manner, using lists presorted by proximity to selected quantized constellation points for all previously processed layers.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, where such a device, system or part may be implemented in hardware that is programmable by firmware or software. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 4A, 4B and 4C are diagrams illustrating processes of K-Best MIMO signal detection, including reduced complexity K-Best MIMO signal detection, according to embodiments of the present disclosure;

FIGS. 5A, 5B and 5C depict comparative performance plots for MMSE, ML and K-Best detectors, including performance of reduced complexity K-Best MIMO signal detection, according to embodiments of the present disclosure.

DETAILED DESCRIPTION

FIGS. 1 through 6, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system. MIMO antenna systems are an integral part of fourth generation communications systems such as Long Term Evolution (LTE), LTE Advanced (LTE-A) and Worldwide Interoperability for Microwave Access (WiMAX). To achieve high spectral efficiency, as many as eight antennas are supported at both receiver and transmitter in LTE Release 10. Further, higher order modulations such as Quadrature Amplitude Modulation with 64 constellation points (64-QAM) are used in a high signal-to-noise ratio (SNR) scenario. High modulation order coupled with multiple antennas presents an extremely challenging detection problem at the receiver.

In mobile devices there are two competing objectives for system design: On the one hand, achieving the maximum possible data transfer rates (or throughput) are desired, while on the other battery conservation necessitates high performance algorithms with low computational complexity. In a hypothetical L×L system (having L rows of antenna elements each with L elements) with an M-ary modulation system (transmitting M bits in parallel), the computational complexity of performing Minimum Mean Square Error (MMSE) detection scales as O(ML), while the computational complexity of Maximum Likelihood (ML) detection scales as $O(M^L)$. Thus, for example, for a 64-QAM 4×4 system, the complexity of performing ML detection is prohibitive.

Figure 1:
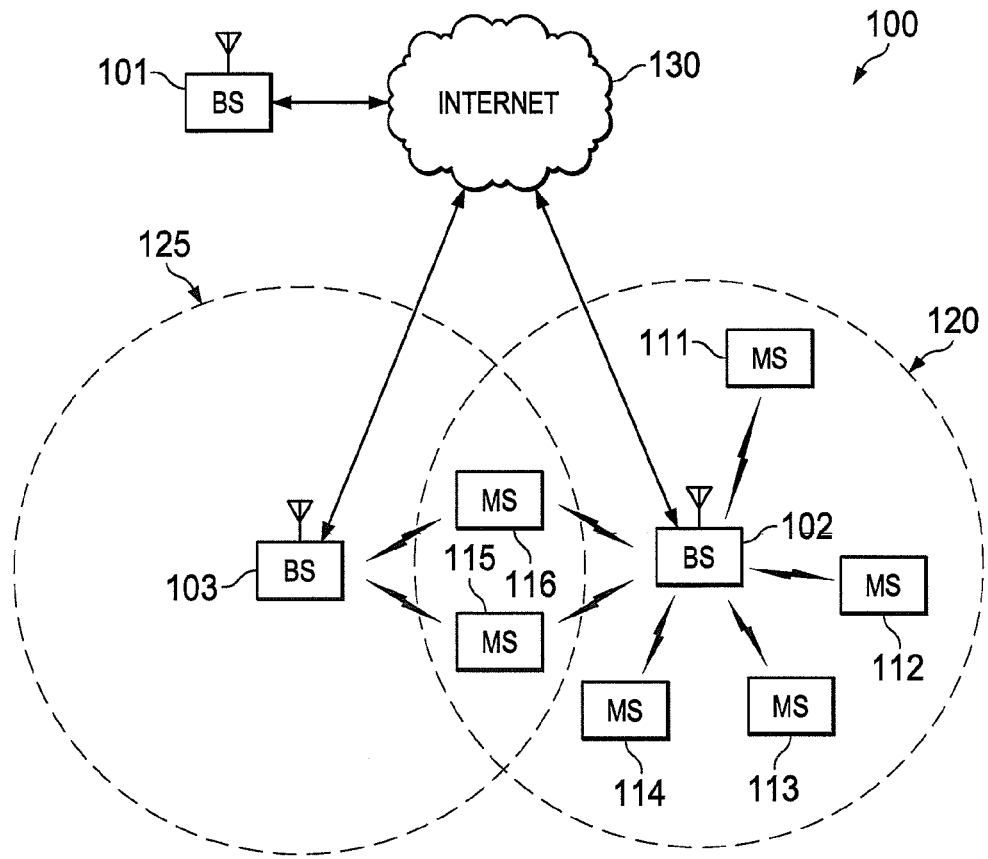
FIG. 1 is a high level diagram illustrating an exemplary wireless network implementing MIMO signal detection according to one or more embodiments of the present disclosure.

FIG. 1 is a high level diagram illustrating an exemplary wireless network implementing MIMO signal detection according to one or more embodiments of the present disclosure. The wireless network 100 illustrated in FIG. 1 is provided solely for purposes of explaining the subject matter of the present disclosure, and is not intended to suggest any limitation regarding the applicability of that subject matter. Other wireless networks may employ the subject matter depicted in the drawings and described herein without departing from the scope of the present disclosure. In addition, those skilled in the art will recognize that the complete structure and operation of a wireless network and the components thereof are depicted in the drawings and described therein. Instead, for simplicity and clarity, only so much of the structure and operation of the wireless network and the components thereof as are unique to the present disclosure or necessary for an understanding of the present disclosure are depicted and described.

In the illustrated embodiment, wireless network 100 includes a base station (BS) 101, BS 102, and BS 103. Depending on the network type, other well-known terms may be used instead of "base station," such as "Evolved Node B" (eNB) or "access point" (AP). For simplicity and clarity, the term "base station" will be used herein to refer to the network infrastructure components that provide or facilitate wireless communications network access to remote (mobile or fixed) terminals.

The BS 101 communicates with BS 102 and BS 103 via network 130 operating according to a standardized protocol (e.g., X2 protocol), via a proprietary protocol, or preferably via Internet protocol (IP). IP network 130 may include any IP-based network or a combination thereof, such as the Internet, a proprietary IP network, or another data network.

The BS 102 provides wireless broadband access to a first plurality of mobile stations (MSs) within coverage area 120 of BS 102. In the example illustrated, the first plurality of MSs includes MS 111, which may be located in a small business; MS 112, which may be located in an enterprise; MS 113, which may be located in a wireless fidelity (WiFi) hotspot; MS 114, which may be located in a first residence; MS 115, which may be located in a second residence; and MS 116, which may be a mobile device, such as a cell phone, a wireless laptop, a wireless-enabled tablet, or the like. For simplicity and clarity, the term "mobile station" or "MS" is used herein to designate any remote wireless equipment that wirelessly accesses or communicates with a BS, whether the MS is a mobile device (e.g., cell phone, wireless-enabled tablet or laptop, etc.) or is normally considered a stationary device (e.g., desktop personal computer, wireless television receiver, etc.). In other systems, other well-known terms may be used instead of "mobile station," such as "user equipment" (UE), "subscriber station" (SS), "remote terminal" (RT), "wireless terminal" (WT), and the like.

The BS 103 provides wireless broadband access to a second plurality of MSs within coverage area 125 of BS 103. The second plurality of MSs includes MS 115 and MS 116. In an exemplary embodiment, BSs 101-103 communicate with each other and with MSs 111-116 using millimeter wave wireless communications. While only six MSs are depicted in FIG. 1, it will be understood that wireless network 100 may provide wireless broadband access to additional MSs.

Figure 2A:
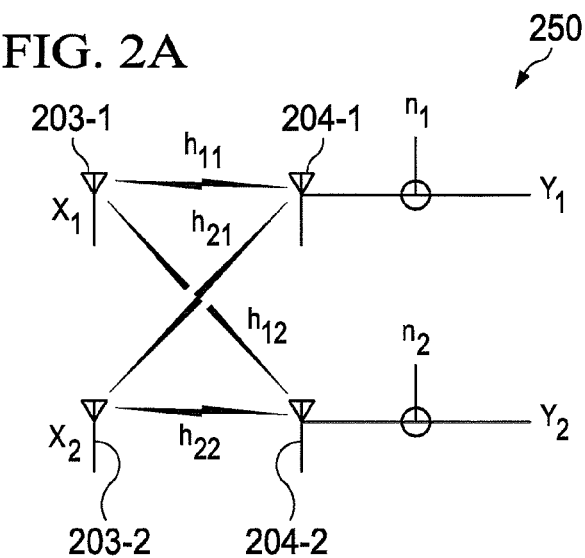
FIGS. 2 and 2A are diagrams of components and signals within a transmitter and a receiver for a MIMO signal transmission system in a wireless network implementing MIMO signal detection according to one or more embodiments of the present disclosure.
Figure 2:
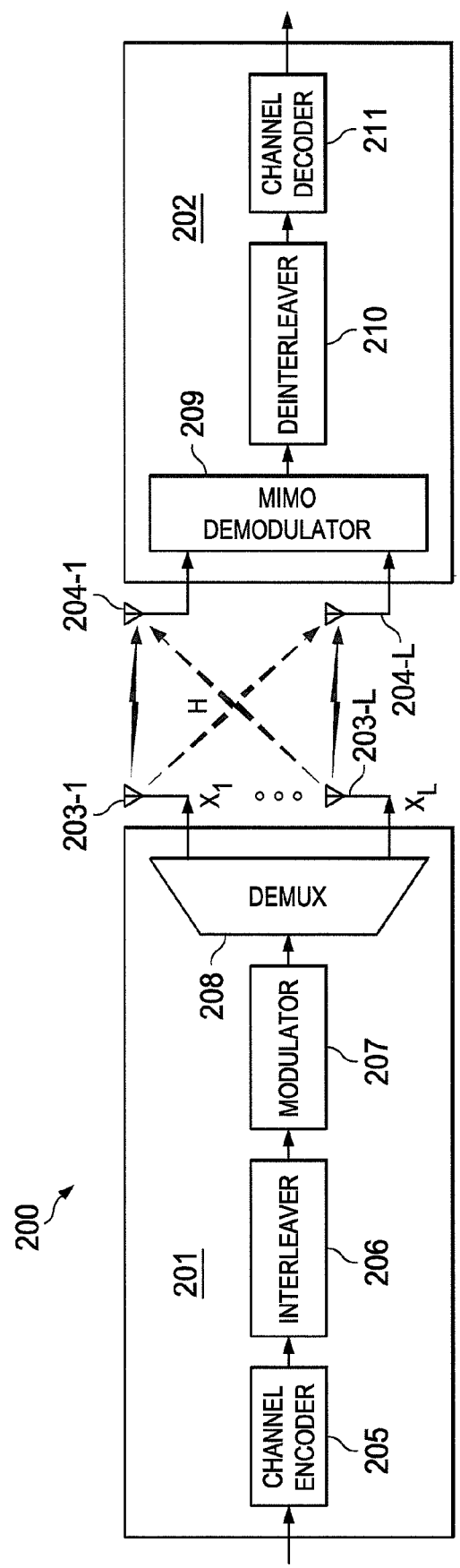

FIGS. 2 and 2A are diagrams of components and signals within a transmitter and a receiver for a MIMO signal transmission system in a wireless network implementing MIMO signal detection according to one or more embodiments of the present disclosure. MIMO signal transmission system 200 includes a transmitter 201 coupled to an array of L antenna or antenna elements 203-1 to 203-L and a receiver 202 coupled to an array of L antenna or antenna elements 204-1 to 204-L, with the transmitter 201 forming part of one of BSs 101-103 and the receiver 202 forming part of one of the MSs 111-116 in the exemplary embodiment. As understood by those skilled in the art, each BS 101-103 and each MS 111-116 includes both a transmitter and a receiver each separately coupled to the respective antenna array to transmit or receive radio frequency signals over channel H, such that the transmitter 201 may alternatively be disposed within one of the MSs 111-116 and the receiver 202 may alternatively be disposed within one of the BSs 101-103.

In the example depicted, the transmitter 201 includes encoding and modulation circuitry comprising channel encoder 205 receiving and encoding data for transmission, an interleaver 206 coupled to the channel encoder 205, a modulator 207 coupled to the interleaver 206, and a demultiplexer 208 coupled to the modulator 207 and antenna elements 203-1 to 203-L, In the example depicted, the receiver 202 includes a MIMO demodulator 209 coupled to the antenna elements 204-1 to 204-L, a deinterleaver 210 coupled to the MIMO demodulator 209 and a channel decoder 211 coupled to the deinterleaver 210. In addition, transmitter 201 and receiver 202 may each include a programmable processor or controller including and/or connected to memory and coupled to the respective transmitter and receiver chains for controlling operation of the respective BS or MS. Using such components, synchronization signals are transmitted by a BS and received by an MS in the manner described in further detail below.

FIG. 2A illustrates MIMO signal transmission in a wireless network implementing MIMO signal detection according to one or more embodiments of the present disclosure. As discussed above, MIMO signal transmission utilizes multiple antenna elements at both the transmitter and receiver. The MIMO transmission arrangement 250 illustrated by FIG. 2A includes transmitter antenna elements 203-1 and 203-2 located within one of BSs 101, 102 and 103, and receiver antenna elements 204-1 and 204-2 located within one of MSs 111, 112, 113, 114, 115 and 116. For simplicity, a 2×2 (i.e., two layer) MIMO system is illustrated, although those skilled in the art will understand how the mathematics discussed below extends to large L×L systems. The mathematical equation governing signals transmitted over channel H between antenna elements 203-1 and 203-2 and antenna elements 204-1 and 204-2 is given as:

$$\begin{bmatrix} Y_1 \\ Y_2 \end{bmatrix} = \begin{bmatrix} h_{11} & h_{12} \\ h_{21} & h_{22} \end{bmatrix} \begin{bmatrix} X_1 \\ X_2 \end{bmatrix} + \begin{bmatrix} n_1 \\ n_2 \end{bmatrix} \qquad (1)$$

where $Y_1$ and $Y_2$ are the received signal at antenna elements 204-1 and 204-2, respectively, $X_1$ and $X_2$ are the symbols transmitted by antenna elements 203-1 and 203-2, respectively, $h_{11}$ and $h_{12}$ represent characteristics of channel H between antenna element 203-1 and antenna elements 204-1 and 204-2, respectively, $h_{21}$ and $h_{22}$ represent channel characteristics between antenna element 203-2 and antenna elements 204-1 and 204-2, respectively, and $n_1$ and $n_2$ are independent identically distributed (i.i.d.) Gaussian input signals with variance $\sigma^2$. The essential problem of MIMO detection is to recover estimates of the bits in $X_1$ and $X_2$. Since the system is coded, interest is focused on the soft estimates (i.e., log-likelihood ratios or "LLRs") instead of the actual bits themselves, where the soft estimates are then fed to the turbo decoder. The performance of any detector is finally evaluated according to the resulting block error rate (BLEB) (sometimes also referred to as frame error rate or "FER") performance as a function of the SNR.

ML Detectors

For purposes of discussion, the ML detector is assumed to transmit symbols picked from the M-ary constellation, denoted as $Q_M\{q_1, q_2, \ldots, q_M\}$, with bits in a transmitted symbol $X_1$ denoted as $\{X_1[0], X_1[1], \ldots, X_1[\log_2 M]\}$. If interested in the LLR of $X_1[0]$, that is $$LLR(X_1[0]) = \log \frac{P(X_1[0] = 0 \mid Y_1 = y_1, Y_2 = y_2)}{P(X_1[1] = 1 \mid Y_1 = y_1, Y_2 = y_2)} \quad (2)$$

The numerator in equation (2) can be expanded as $$\Sigma_{x_1, x_2 \in Q_M \times Q_M : x_1[0]=0} P(X_1 = x_1, X_2 = x_2 \mid Y_1 = y_1, Y_2 = y_2) \quad (3)$$

Thus, the LLR computation involves a summation over all tuples $(x_1, x_2) \in Q_M \times Q_M$ such that $x_1[0]=0$ for the numerator and all tuples $(x_1, x_2) \in Q_M \times Q_M$ such that $x_1[0]=1$ for the denominator. In all a total of $M^2$ computations are required for calculating the probabilities and $M^2$ summations for calculating the result, such that the computation complexity scales as $M^2$ in the two layer case. It is easy to verify that, in general for L layers, the number of computations scales as $M^L$.

MMSE Detector

The MMSE detector (for example, see G. J. Foschini, Jr., "Layered space-time architecture for wireless communication in a fading environment when using multi-element antennas," Bell Labs Tech. J., pp. 41-59, Autumn 1996) attempts to reduce the problem complexity by breaking the problem up into L sub-problems. For the two layer example, the MMSA detector transforms equation (1) by pre-multiplying the equation with the MMSE matrix:

$$G = H^H(HH^H + \sigma^2 I)^{-1}. \quad (4)$$

With this transformation, the two codewords in equation (1) can be decomposed as $$\tilde{Y}_1 = \tilde{h}_1 X_1 + \tilde{n}_1 \quad (5)$$

and $$\tilde{Y}_2 = \tilde{h}_2 X_2 + \tilde{n}_2. \quad (6)$$

With this simplification, the LLR computation for $X_1[0]$ can be written as $$LLR(X_1[0]) = \log \frac{x_1 \in Q_{M:x_1[0]=0}^{max} P(X_1 = x_1 \mid \tilde{Y}_1 = \tilde{y}_1)}{x_1 \in Q_{M:x_1[0]=1}^{max} P(X_1 = x_1 \mid \tilde{Y}_1 = \tilde{y}_1)}. \quad (7)$$

Thus, the computational burden for computing the LLR of a certain bit in this (two layer) case is reduced from $O(M^2)$ to $O(2M)$. In the L layer case, the complexity is reduced from $O(M^L)$ to $O(ML)$.

Performance of MMSE Versus ML

Figure 3:
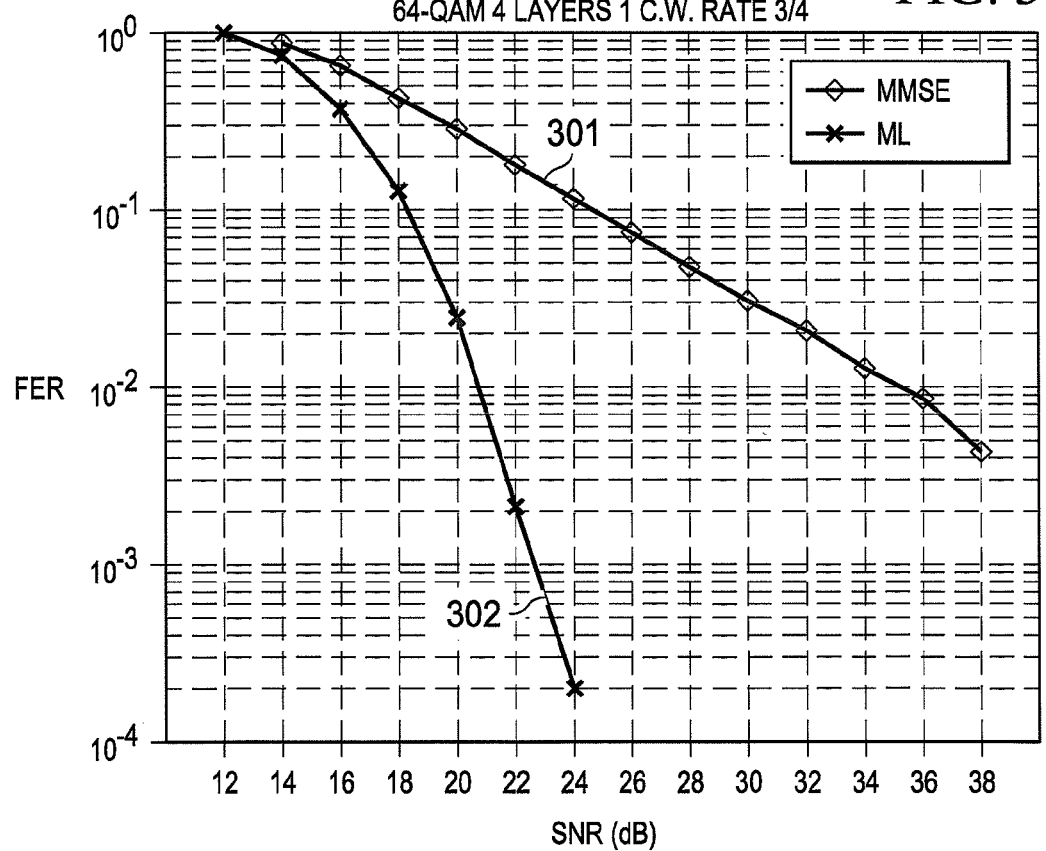
FIG. 3 depicts comparative performance plots for MMSE and ML detectors according to one or more embodiments of the present disclosure.

The reduction in computational complexity for MMSE versus ML comes at a dramatic loss of performance. FIG. 3 depicts comparative performance (FER as a function of SNR) of these two detectors when used over a block fading 4×4 channel with 64 QAM modulation. The upper trace 301 (diamond outline data points) depicts MMSE performance, while the lower trace 302 (solid diamond data points) depicts ML performance. It is clear from this figure that MMSE incurs a huge performance loss over ML. Each 3 dB in performance loss translates to a halving of the link capacity. Thus, the ability to achieve complexity close to that of an MMSE detector while still achieving the gains promised by the ML detector would significantly improve the capacity of a $4^{th}$ Generation (4-G) communication systems.

K-Best Detector

The K-Best detector (see "Evolved Universal Terrestrial Radio Access (E-UTRA); User Equipment (UE) radio access capabilities (Release 10)," 3GPP TS 36.306 V10.2.0, June 2011) attempts to output a list of size K consisting of the most likely values of the transmitted symbols $X_1, X_2, \ldots, X_L$ based on the observations $Y_1, Y_2, \ldots Y_L$. This detector works by first decomposing the matrix H via QR transformation as $$H = QR \quad (8)$$

where Q is a unitary matrix and R is an upper triangular matrix. Then applying the transform $Q^{-1}$ to the received signal results in $$\begin{pmatrix} \tilde{Y}_1 \\ \tilde{Y}_2 \end{pmatrix} = \begin{pmatrix} r_{11} & r_{12} \\ & r_{22} \end{pmatrix} \begin{pmatrix} X_1 \\ X_2 \end{pmatrix} + \begin{pmatrix} \tilde{n}_1 \\ \tilde{n}_2 \end{pmatrix} \quad (9)$$

where $\tilde{n}_1$ and $\tilde{n}_2$ are independent additive white Gaussian noise (AWGN) terms with the same variance as $n_1$ and $n_2$. Using the second row of equation (9), the K most likely values of $X_2$ can be found. For simplicity, assume K=2 and the most likely values for $X_2$ are $q_1$ and $q_2$. Then in the next step, the likelihood is computed for the transmitted symbols $[X_1, q_1]$ and $[X_1, q_2]$ for all values of $X_1 \in \{q_1, q_2, \ldots, q_M\}$. Finally, the two best values of the tuples are retained. Thus, for example, if the two best tupples obtained are $[q_3, q_1]$ and $[q_2, q_2]$, then those two tuples are the output of the K-Best detector.

In case of more than two layers, the same procedure is followed. For example, if there were three layers, then for the last layer the likelihoods for $[X_1, q_3, q_1]$ and $[X_1, q_2, q_2]$ for all values of $X_1 \in \{q_1, q_2, \ldots, q_M\}$ are computed, and the two best tuples are retained. Since KM candidates are evaluated at each stage, the computational complexity of the K-Best detector scales as O(KML). While this is less than the ML detector, it is significantly higher than the MMSE detector with a complexity of O(ML).

Soft Decision K-Best Detector

The K-Best detector outputs a list of the K most likely tuples for the transmitted symbols $X_1, X_2, \ldots, X_L$. However, it is the LLRs of the bits in each symbol that are of interest, not the most likely values of the symbols themselves. Thus the K-Best algorithm has to be modified to work with a coded system that needs the LLRs as the input to the decoder. One straightforward way to achieve that objective is to modify the formula in equation (7) as $$LLR(X_1[0]) = \log \frac{\max_{x_1, x_2 \in \kappa : x_1[0]=0} P(X_1 = x_1 \mid \tilde{Y}_1 = \tilde{y}_1)}{\max_{x_1, x_2 \in \kappa : x_1[0]=1} P(X_1 = x_1 \mid \tilde{Y}_1 = \tilde{y}_1)}. \quad (10)$$

where $\kappa$ is the K-Best set. However, this scheme fails whenever the set $\kappa$ is such that either of the sets specified in the max function in numerator or denominator is empty. Note that even in this case, the sign of the LLR may be deduced, depending on whichever set is empty. Thus, if (for example) the numerator set is empty, then none of the sequences with $x_1[0]=0$ are in the K-Best set and the likelihood of $x_1[0]=1$ is higher than that of $x_1[0]=0$, so the LLR is a negative number. In K. Higuchi, et al., "Likelihood function for QRM-MLD suitable for soft-decision turbo decoding and its performance for OFCDM MIMO multiplexing in multipath fading channel," 15*th IEEE International Symposium on Personal, Indoor and Mobile Radio Communications,* 2004, vol. 2, pp. 1142-1148 (5-8 Sep. 2004), the following modification was proposed to handle such scenarios; First, all LLRs are computed as $$LLR(X_1[0]) = \sqrt{\log(\max_{x_1,x_2 \in K: x_1[0]=0} P(X_1=x_1|\tilde{Y}_1=\tilde{y}_1))} - \sqrt{\log(\max_{x_1,x_2 \in K: x_1[0]=1} P(X_1=x_1|\tilde{Y}_1=\tilde{y}_1))}. \quad (11)$$

for which both sets in the maximization in equation (11) exist, and then LLRs that are not computable using equation (11) are set to 1.5 times the maximum LLRs, with the correct sign. This modification performs well in simulations. The choice of the multiplier 1.5 and the use of the square root operation were determined empirically.

Selection of the K-Best set in this design may be understood by considering a 4×4 MIMO system after QR decomposition, which may be described by the equation:

$$\begin{bmatrix} Y_1 \\ Y_2 \\ Y_3 \\ Y_4 \end{bmatrix} = \begin{bmatrix} r_{11} & r_{12} & r_{13} & r_{14} \\ 0 & r_{22} & r_{23} & r_{24} \\ 0 & 0 & r_{33} & r_{34} \\ 0 & 0 & 0 & r_{44} \end{bmatrix} \begin{bmatrix} X_1 \\ X_2 \\ X_3 \\ X_4 \end{bmatrix} + \begin{bmatrix} n_1 \\ n_2 \\ n_3 \\ n_4 \end{bmatrix} \quad (12)$$

Beginning at layer 4, M candidates are evaluated for $X_4$ according to the equation:

$$Y_4 = r_{44} X_4 + n_4 \quad (13)$$

The K best candidates (according to log likelihood ratios) are taken forward and KM candidates are evaluated for the tuples $(X_3, X_4)$ according to the equation:

$$Y_3 = r_{33} X_3 + r_{34} X_4 + n_3 \quad (14)$$

The K such tuples having the best likelihoods are then carried forward for evaluation of M candidates for $X_3$ for layer 3 to determine the K best candidates carried forward for evaluation of KM tuples. Note that at each layer i, computing the Euclidean distance $$\left| Y_i = \sum_{j=i}^{n} = r_{ij} x_j \right|^2$$

is equivalent to computing the log likelihood.

Thus, for each layer i, KM candidates are evaluated and the Euclidean distance from the received signal $Y_{n-i}$ is computed, and then the top K candidates are selected. For each layer i, KM Euclidean distance calculations are performed, such that the Euclidean distance computation is the dominant module in terms of computational cost for this algorithm. FIG. 4A illustrates one example 400 of how the computations are performed, assuming a 16 QAM system with K=5. After the first two steps, the tuples $(q_4,q_1)$, $(q_1,q_3)$ $(q_5,q_1)$, $(q_{11},q_6)$ and $(q_7,q_{13})$ have been selected for $(X_3,X_4)$ from the previous two layers. To update the K-Best set in the next step, all 16 possibilities for $X_2$ need to be considered with each of these five K-Best candidates from the previous layer. Out of all these 16×5=80 possibilities, the top 5 are then selected and used as the K-Best set for the next layer.

Reduced Complexity K-Best Detector

Based on the soft decision K-Best detector described above, a reduced complexity MIMO signal detector is implemented with much less use of computational resources while obtaining comparable performance. The K-Best set is obtained differently, with significant savings of computational complexity in the selection of the K-Best set in each layer. In one embodiment of the present disclosure, this algorithm proceeds as follows: For the ith layer, compute the quantity $$\hat{X}_i = Y_i - \sum_{j=i+1}^{n} r_{ij} x_j \quad (15)$$

Subsequently, quantize $\hat{X}_i$ to the nearest constellation point. For each constellation point $q_i: 1 \in \{1, \ldots, M\}$, a list of nearest constellation points has been pre-computed, and only candidates from the head of all these lists are considered for the next K-Best set computation, evaluating the Euclidean distance of each of these tuples from the received signal and choosing the one with the minimum distance. Subsequently, the list corresponding to the choice of tuple is advanced and the Euclidean distance for the new tuple at its head is computed.

Figure 4C:
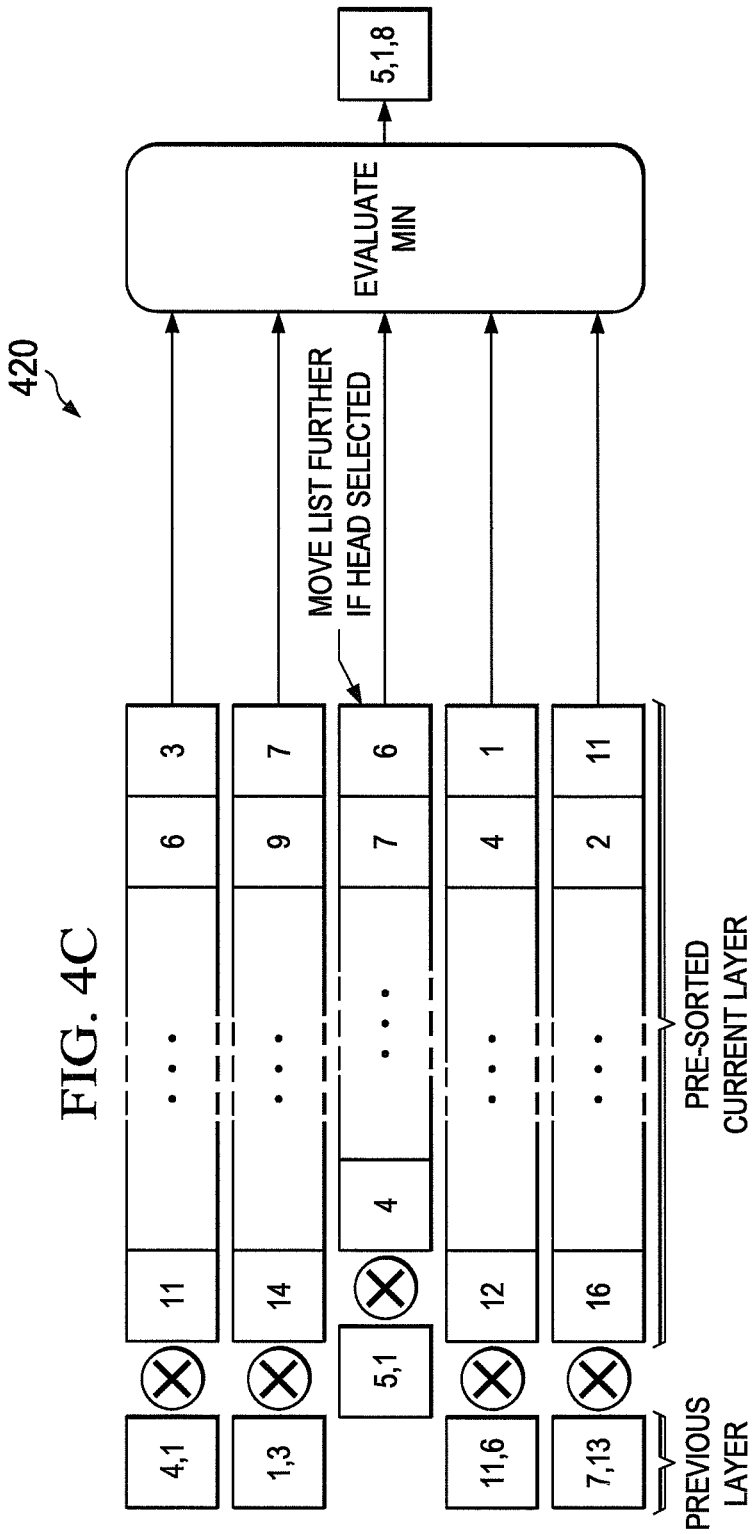

FIGS. 4B and 4C illustrates an example of this procedure, using the analogous problem of FIG. 4A solved with the new algorithm. As before, the K-Best set for the third and fourth layers has already been obtained, which set is given as $(X_3, X_4) = \{(q_4,q_1), (q_1,q_3), (q_5,q_1), (q_{11},q_6), (q_7,q_{13})\}$. For each element in the K-Best set, the quantity $\hat{X}_2 = Y_2 - r_{23} X_3 - r_{24} X_4$ is computed—that is, the estimate $\hat{X}_2$ of the transmitted signal for layer 2, which is determined based on the received signal $Y_2$ for layer 2 with compensation for the previously computed transmitted signal estimates $X_3$, $X_4$ for layers 3 and 4, respectively. The transmitted signal estimate $\hat{X}_2$ is subsequently quantized to the nearest constellation point. In the example under consideration these quantized points, corresponding to each choice of $(X_3,X_4)$, are $(q_3, q_7, q_8, q_1, q_{11})$. For each such point, a presorted list of closest constellation points is employed to obtain the K-Best set of candidates for the next layer.

Thus, for example, in FIG. 4B the estimate $\hat{X}_2$ of the transmitted signal for layer 2 is first determined according to equation (15) based on the received signal $Y_2$ for layer 2 with the values $X_3=4$ and $X_4=1$ to select a first set of candidates in FIG. 4B. The result is quantized to the nearest point in the constellation, which is 3 in the example shown. A list of candidates having that constellation point (3) at the head will then be selected to evaluate candidates for the current layer. The remaining constellation point candidates in that list have been presorted based on proximity to constellation point 3. Likewise, the estimate $\hat{X}_2$ of the transmitted signal for layer 2 is next determined according to equation (15) based on the received signal $Y_2$ for layer 2 with the values 1, 3 for $X_3$, $X_4$, respectively, and the result is quantized to the nearest constellation point: 7. A list with 7 at the head and the remaining constellation point candidates in the list presorted based on proximity to constellation point 7 is selected as the second set of candidates to evaluate for the current layer. For the values $X_3=5$ and $X_4=1$, the result is quantized to 8 and a list with 8 at the head is selected; for the values $X_3=11$ and $X_4=6$, the result is quantized to 1 and a list with 1 at the head is selected; and for the values $X_3=7$ and $X_4=13$, the result is quantized to the nearest constellation point and a list with 11 at the head is selected. As with the first two lists of candidates selected for evaluation of the received signal of layer 2, each of the last three lists are presorted based on proximity of the remaining constellation point candidates in that respective list to the head of that list.

Instead of evaluating all 16×5=80 candidates in the five selected lists of sixteen candidates, each, the evaluation of the candidate lists starts with the Euclidean distances of the candidates given by the head of the lists (the right-most values in FIG. 4B). Since there are only K such lists, only K Euclidean distance computations are needed in this step. That is, with reference to FIG. 4B, the distance of the estimate $X_2$ for the values $X_3=4$ and $X_4=1$ from the constellation point 3 is determined. Likewise the distances of the estimate $\hat{X}_2$ for the values $X_3=1$ and $X_4=3$ from the constellation point 7, of the estimate $\hat{X}_2$ for the values $X_3=5$ and $X_4=1$ from the constellation point 8, of the estimate $\hat{X}_2$ for the values $X_3=11$ and $X_4=6$ from the constellation point 1, and of the estimate $\hat{X}_2$ for the values $X_3=7$ and $X_4=13$ from the constellation point 11 are all determined.

Subsequently the minimum of these Euclidean distances is identified and the tuple with the minimum distance is selected and placed in the next K-Best set. For example, the head of the middle list (quantized constellation point $q_8$) in FIG. 4B is selected in this example. That value thus becomes a member of the K-Best set (5,1,8) for processing the signal received in the next layer (layer 1 for the example of FIGS. 4B and 4C).

In addition, the list corresponding to the selected tuple is advanced as illustrated in FIG. 4C, and the Euclidean distance of the next tuple for that forwarded list is computed. Thus, in the example of FIGS. 4B and 4C, the tuple (5,1,8) is selected for the next K-best set and, corresponding to that tuple, the list position is advanced to the next element, which is (5,1,6), so that the Euclidean distance of that element may be evaluated. The candidate among the heads of each of the lists with the minimum distance from the transmitted signal estimate is again identified, and selected as part of a tuple to be evaluated for the next layer.

The algorithm halts when K elements are obtained for the next K-Best set. Thus, in total a further K Euclidean distance computations are performed, in addition to the original K Euclidean distance computations in the first step. The number of Euclidean distance computations is therefore reduced from KM to 2K, achieving a complexity reduction of M/2 for this step. For 64 QAM, this algorithm saves approximately a factor of 30 times the number of computations over the soft decision K-Best approach discussed above. The rest of the algorithm proceeds in a similar manner to the original steps of the soft decision K-Best algorithm described above. That is, once the K-best set is calculated, the LLRs are computed in accordance with equation (11) and the associated description.

Figure 5A:
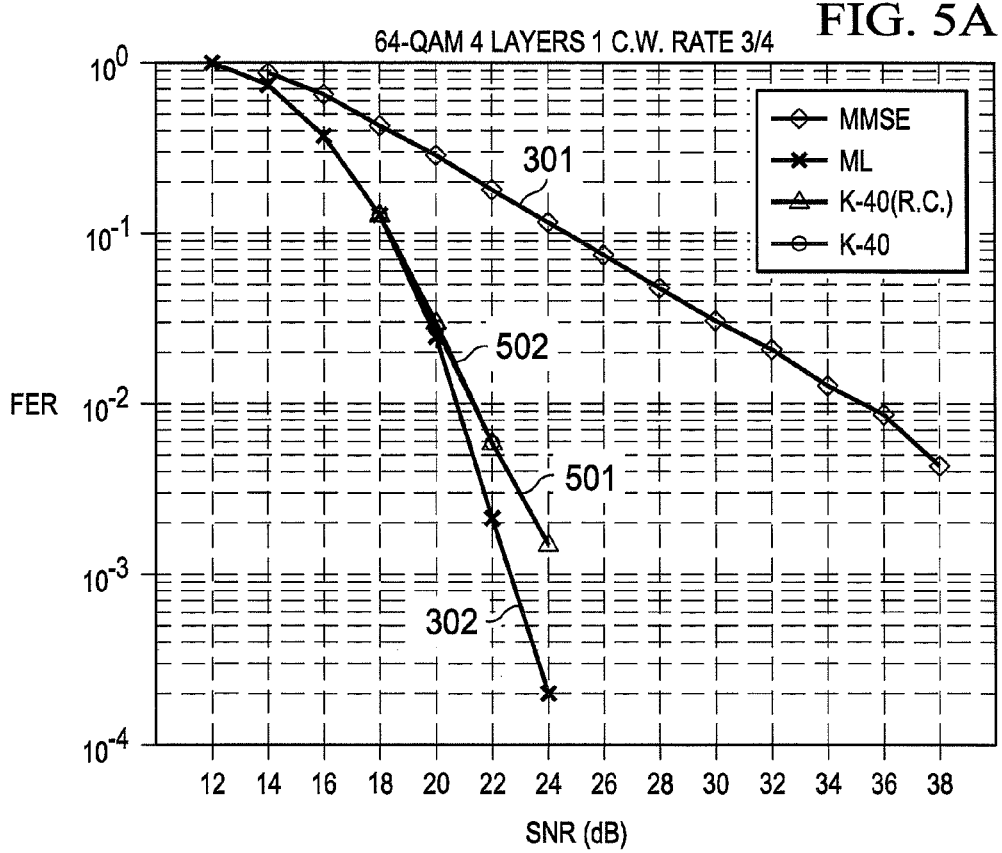
Figure 5B:
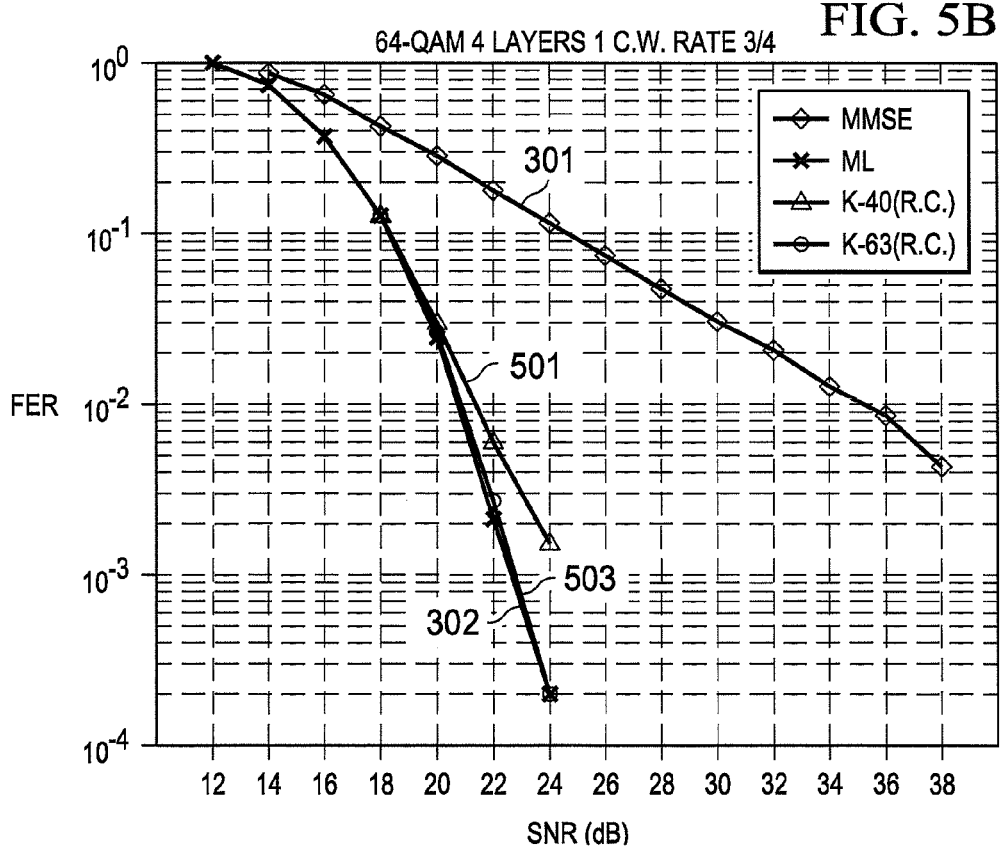

FIGS. 5A, 5B and 5C depict comparative performance plots for MMSE, ML and K-Best detectors, including performance of reduced complexity K-Best MIMO signal detection according to embodiments of the present disclosure. As with FIG. 3, performance (FER rates as a function of SNR) is plotted for a 4×4 MIMO system with 64-QAM. Trace 501 in FIGS. 5A and 5B represents performance of the reduced complexity K-Best detector of the present disclosure, with K=40. Trace 502 in FIG. 5A represents performance of the soft decision K-Best detection algorithm discussed above, also with K=40. FIG. 5A shows that the complexity reduction technique does not hurt the performance of the K-best algorithm as compared with the soft decision technique. As evident, performance of the reduced complexity K-Best algorithm of the present disclosure is comparable to the performance of the soft decision K-Best detection algorithm.

Trace 503 in FIG. 5B represents performance of the reduced complexity K-Best detector of the present disclosure with K=63. As shown, performance of the reduced complexity K-Best detector under those circumstances closely tracks performance of an ML detector, with significantly less computational complexity.

Moreover, the precise operation count for the reduced complexity K-Best detection algorithm compares favorably with the MMSE and K-Best approaches discussed above. Focusing on the number of multiplications, since those operations are the most resource intensive, the algorithms are generally benchmarked according to the number of such operations required. Considering a 4×4 system with 64-QAM: For this scenario, the MMSE algorithm requires 3256 multiplications, while the original K-Best algorithm requires 1405+ 30KM+6M multiplications and the reduced complexity K-Best algorithm of the present disclosure requires 1405+ 78K multiplications. Thus, the number of multiplications for the reduced complexity K-Best algorithm with K=63 is equal to 6319, less than double the number of multiplications for the MMSE algorithm and almost 20 times less than 122,709 multiplications required by the original K-Best algorithm for K=63. However, the performance of the reduced complexity K-Best algorithm for K=63 is identical to the superior performance of the ML algorithm, as shown in FIG. 5B. Thus, the reduced complexity K-Best algorithm yields a complexity savings of almost 20 times over the original scheme but with performance comparable to the best performance among those alternatives.

Finally, FIG. 5C depicts performance of the reduced complexity K-best algorithm of the present disclosure for various values of K. Traces 504 (square outline plot points), 505 (circular outline plot points) and 506 (inverted triangle outline plot points) depict the reduced complexity K-Best detector performance for K=10, 20 and 40, respectively. Depending upon the region of operation, a suitable number for K may be chosen. For example, in Long Term Evolution (LTE) Release 10, a BLER/FER of about 10% is often considered to be a desirable region of operation. In this case, the value K=20 may be selected since the reduced complexity algorithm has performance identical to ML in this region. With that choice of K, the number of multiplications required is only 2965, and thus the reduced complexity algorithm requires less computational resources than required for MMSE while achieving performance equivalent to that of the ML detector.

Figure 6:
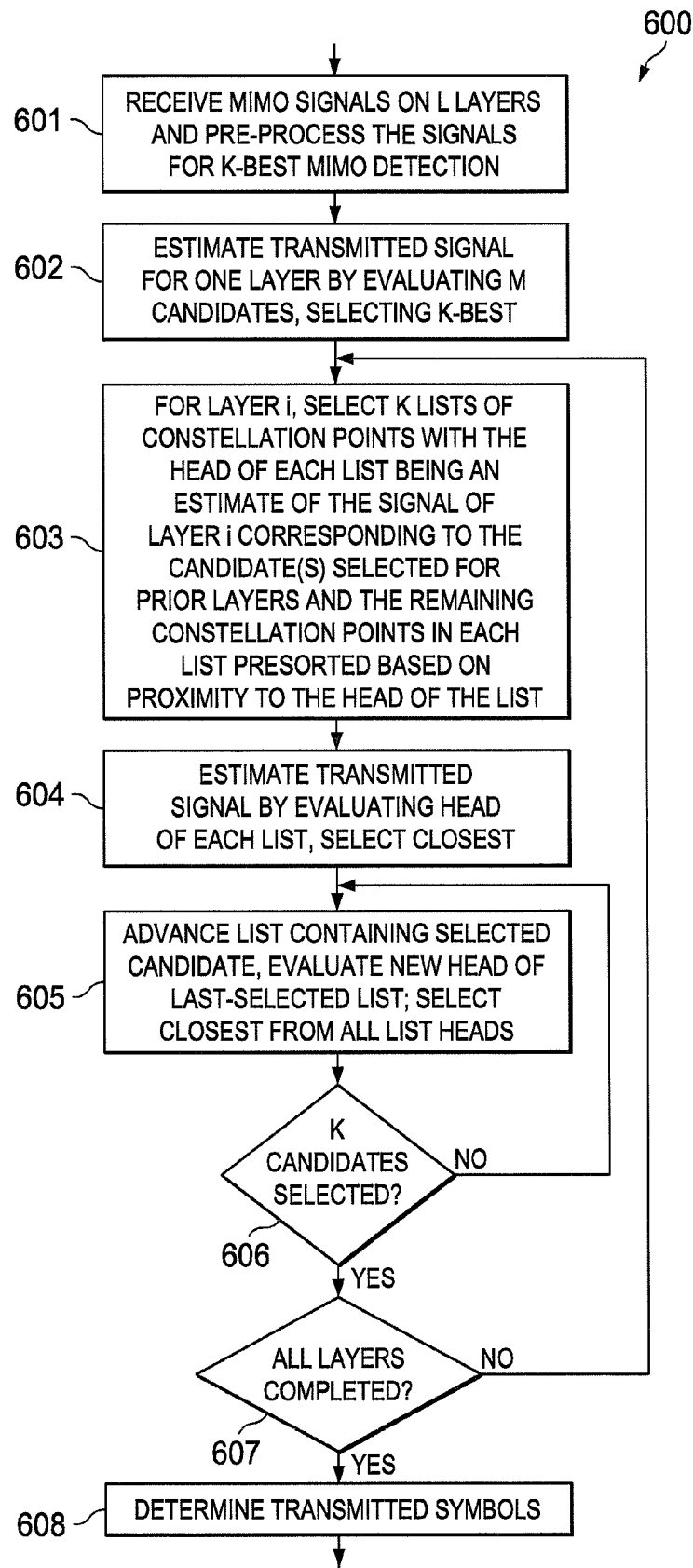
FIG. 6 is a high level flow chart illustrating a process of reduced complexity K-Best MIMO signal detection according to one embodiment of the present disclosure.

FIG. 6 is a high level flow chart illustrating a process of reduced complexity K-Best MIMO signal detection according to one embodiment of the present disclosure. While the flow chart depicts a series of sequential steps, unless explicitly stated no inference should be drawn from that sequence regarding specific order of performance, performance of steps or portions thereof serially rather than concurrently or in an overlapping manner, or performance of the steps depicted exclusively without the occurrence of intervening or intermediate steps. Moreover, those skilled in the art will recognize that a complete process of detecting and decoding received MIMO signals is not illustrated or described. Instead, for simplicity and clarity, only so much of the respective processes as is unique to the present disclosure or necessary for an understanding of the present disclosure is depicted and described. The process 600 in the example depicted is implemented by a receiver chain in, for example, a mobile station.

The process 600 begins with receiving MIMO signals on L antennas or MIMO layers (step 601). Based on a QR decomposition analysis of the received signals, an estimate for the transmitted signal for one layer (the layer corresponding to the triangular matrix row having a single entry, generally the last layer or layer "L" in a MIMO transmission with L layers) is determined by evaluating M candidates and selecting the K best candidates (step 602).

For subsequent layers i, for each of the K best tuples of constellation point candidates selected for the prior layers, an estimate of the received signal of the current layer is derived by removing the interference generated by the prior layers (assuming the corresponding one of the K best tuples of constellation point candidates selected for the prior layers consists of the correct signals transmitted in the prior layers). Each estimate of the received signal of the current layer is then quantized to a point in the constellation of the modulation scheme for the current layer. K lists of presorted constellation point candidates are selected, with the head of each of the K lists being one of the quantized constellation points, and with the remaining constellation point candidates within each list presorted according to "proximity" (e.g., Euclidean distance) to the head of the list (step 603). An estimate of the transmitted signal of the current layer is determined by evaluating the head of each list and selecting the "closest" (again, Euclidean distance from the received signal of the current layer in the exemplary embodiment) among the heads of the K lists evaluated (step 604) as one of the K best candidates for the current layer. The presorted candidates within the list containing the selected closest candidate is then advanced (step 605), so that the candidate that was previously second on the list becomes the new head of that list. The new head of the list containing the last-selected closest candidate is then evaluated and the closest candidate among all of the list heads (including the "old" list heads previously evaluated and the "new" list head in the list that contained the last-selected candidate) is selected as another of the K-Best candidates for the current layer.

A determination is then made as to whether K candidates for the current layer have been selected (step 606). If not, the process returns to advance the list that contained the just-selected candidate and evaluate the new list head, selecting the closest candidate from all current list heads as another of the K best candidates for the current layer.

Once the K best candidates for the current layer have been determined in the manner described, a determination is then made as to whether all layers have been processed (step 607). If not, the process returns to selecting (for the next layer) K presorted lists based on proximity to a version (e.g., a quantized version) of the received signal for the next layer. If all layers have been processed, however, a determination is made of the transmitted signals (step 608) based on the K best candidates selected in prior portions of the process. The transmitted signals will subsequently be decoded, etc.

The present disclosure provides a very low complexity MIMO detection algorithm for modem chips in mobile stations. The potential commercial benefits are increased throughput, improved cellular reception and conservation of battery power.

Although the present disclosure has been described with an exemplary embodiment, various changes and modifications may be suggested to one skilled in the art. It is intended that the present disclosure encompass such changes and modifications as fall within the scope of the appended claims.

What is claimed is:
1. A method, comprising:
in a multiple input, multiple output (MIMO) transmission system having L layers, selecting a plurality of constellation point candidates for a first layer; and
for each other i-th layer of the L layers, selecting a plurality of lists of constellation point candidates with a head of each list being a transmitted signal estimate for a current layer quantized to the constellation, wherein remaining constellation point candidates within each of the lists are presorted according to proximity to the head of the respective list, wherein the transmitted signal estimate for the current layer is derived based on a corresponding set of one or more constellation point candidates for prior layers, and wherein the K candidates for the i-th layer are selected by
selecting, among the heads of the selected plurality of lists, one candidate based upon proximity to the corresponding transmitted signal estimate, and
advancing remaining candidates in the list from which the selected candidate was chosen toward the head of that list,
wherein the selecting and advancing are performed iteratively until K candidates for the i-th layer have been selected,
where L, i and K are integers.
2. The method of claim 1, wherein proximity of a candidate in one of the lists to the head of the respective list is determined based upon a Euclidean distance between the candidate and the head.
3. The method of claim 1, wherein proximity of a candidate in one of the lists to the head of the respective list is determined based upon a log likelihoods calculated for the candidate and head.
4. The method of claim 1, wherein a value of K is selected to obtain a desired block error rate in communications over the MIMO transmission system.
5. The method of claim 1, wherein the transmitted signal estimate is determined from

$$\hat{X}_i = Y_i - \sum_{j=i+1}^{n} r_{ij} x_j$$

where $Y_i$ is a received signal for layer 1, $r_{ij}$ is a triangular matrix entry for a QR decomposition analysis of the received signal, and $x_j$ corresponds to a transmitted signal estimate, where i, j and n are integers.
6. The method of claim 1, further comprising:
determining K quantized constellation point candidates for the first layer.
7. The method of claim 6, further comprising:
selecting K lists of constellation point candidates to evaluate the transmitted signal estimate for a second layer, wherein the K selected lists are presorted according to proximity to the constellation point candidate to which the transmitted signal estimate for the second layer was quantized.
8. The method of claim 7, further comprising:
determining K quantized constellation point candidates for the first layer; and
selecting K lists of constellation point candidates to evaluate the transmitted signal estimate for a third layer, wherein the K selected lists are presorted according to proximity to the constellation point candidate to which the transmitted signal estimate for the third layer was quantized.
9. The method of claim 1, further comprising:
performing only 2K multiplication operations in selecting the constellation point candidates for the i-th layer.

10. The method of claim 1, wherein a value of K is selected based upon a number of multiplications required to select and evaluate K lists of constellation point candidates for the i-th layer.

11. An apparatus comprising:
a receiver in a multiple input, multiple output (MIMO) transmission system having L layers; and
a processor within the receiver configured to select a plurality of constellation point candidates for a first layer,
wherein the processor is configured, for each other i-th layer of the L layers, to select a plurality of lists of constellation point candidates with a head of each list being a transmitted signal estimate for a current layer quantized to the constellation, wherein remaining constellation point candidates within each of the lists are presorted according to proximity to the head of the respective list, wherein the transmitted signal estimate for the current layer is derived based on a corresponding set of one or more constellation point candidates for prior layers, and wherein the K candidates for the i-th layer are selected by
selecting, among the heads of the selected plurality of lists, one candidate based upon proximity to the corresponding transmitted signal estimate, and
advancing remaining candidates in the list from which the selected candidate was chosen toward the head of that list, and
wherein the selecting and advancing are performed iteratively until K candidates for the i-th layer have been selected,
where L, i and K are integers.

12. The apparatus of claim 11, wherein proximity of a candidate in one of the lists to the head of the respective list is determined based upon a Euclidean distance between the candidate and the head.

13. The apparatus of claim 11, wherein proximity of a candidate in one of the lists to the head of the respective list is determined based upon a log likelihoods calculated for the candidate and the head.

14. The apparatus of claim 11, wherein a value of K is selected to obtain a desired block error rate in communications over the MIMO transmission system.

15. The apparatus of claim 11, wherein the processor is configured to determine the transmitted signal estimate from $$\hat{X}_i = Y_i - \sum_{j=i+1}^{n} r_{ij} x_j$$

where $Y_i$ is a received signal for layer i, $r_{ij}$ is a triangular matrix entry for a QR decomposition analysis of the received signal, and $x_j$ corresponds to a transmitted signal estimate, where i, j and n are integers.

16. The apparatus of claim 11, wherein the processor is configured to determine K quantized constellation point candidates for the first layer.

17. The apparatus of claim 16, wherein the processor is configured to select K lists of constellation point candidates to evaluate the transmitted signal estimate for a second layer, and wherein the K selected lists are presorted according to proximity to the constellation point candidate to which the transmitted signal estimate for the second layer was quantized.

18. The apparatus of claim 17, wherein the processor is configured to determine K quantized constellation point candidates for the first layer, and to select K lists of constellation point candidates to evaluate the transmitted signal estimate for a third layer, and wherein the K selected lists are presorted according to proximity to the constellation point candidate to which the transmitted signal estimate for the third layer was quantized.

19. The apparatus of claim 11, wherein the processor is configured to perform only 2K multiplication operations in selecting the constellation point candidates for the i-th layer.

20. The apparatus of claim 11, wherein a value of K is selected based upon a number of multiplications required to select and evaluate K lists of constellation point candidates for the i-th layer.

* * * * *